United States Patent [19]

Hagerlid

[11] Patent Number: 5,759,395
[45] Date of Patent: Jun. 2, 1998

[54] COLUMN ARRANGEMENT

[75] Inventor: Peter Hagerlid, Uppsala, Sweden

[73] Assignee: Pharmacia Biotech AB, Uppsala, Sweden

[21] Appl. No.: 676,167
[22] PCT Filed: Jan. 20, 1995
[86] PCT No.: PCT/SE95/00051
  § 371 Date: Aug. 30, 1996
  § 102(e) Date: Aug. 30, 1996
[87] PCT Pub. No.: WO95/20427
  PCT Pub. Date: Aug. 3, 1995

[30] Foreign Application Priority Data

Jan. 28, 1994 [SE] Sweden ................... 9400263

[51] Int. Cl.$^6$ ................ B01D 24/36; B01D 24/38
[52] U.S. Cl. ................ 210/269; 210/273; 210/291; 210/274
[58] Field of Search .................. 210/273, 279, 210/291, 242.1, 285, 269, 274, 793, 795

[56] References Cited

U.S. PATENT DOCUMENTS

| | | | |
|---|---|---|---|
| 3,143,500 | 8/1964 | Damgaard | 210/279 |
| 3,402,126 | 9/1968 | Cioffi | 210/279 |
| 4,233,158 | 11/1980 | Wachsmuth | 210/291 |
| 4,460,467 | 7/1984 | Ueda | 210/279 |
| 5,415,765 | 5/1995 | Banham et al. | 210/279 |

FOREIGN PATENT DOCUMENTS

| | | |
|---|---|---|
| 1417643 | 10/1968 | Germany. |
| 1642812 | 4/1971 | Germany. |
| 2235196 | 4/1978 | Germany. |
| 320652 | 2/1970 | Sweden. |
| WO9218237 | 10/1992 | WIPO. |

*Primary Examiner*—Cynthia L. Nessler
*Attorney, Agent, or Firm*—Dinsmore & Shohl LLP

[57] ABSTRACT

A structure for the absorption or desorption of a substance on a bed through which liquid is allowed to pass comprises a vessel containing a liquid-permeable bed, a lower adaptor, an upper adaptor and means for providing a liquid flow to the bed through one of the adaptors and means for conducting a liquid flow away from the bed through the other adaptor. The lower adaptor is arranged in the lower part of the vessel and at least partially defines the vessel bottom. The lower adaptor has an opening for the passage of liquid to or from the lower part of the vessel, which opening is directed toward the bed, and the lower adaptor is provided with a distribution facility for distributing or collecting liquid flow towards or from, respectively, a bottom surface of the bed. The upper adaptor is arranged in an upper part of the vessel and at least partially covers a cross-sectional area of the vessel. The upper adaptor has an opening for the passage of liquid to or from the upper part of the vessel, the opening being directed toward the bed, and the upper adaptor is provided with a distribution facility for distributing or collecting liquid flow towards or from, respectively, an upper surface of the bed.

11 Claims, 3 Drawing Sheets

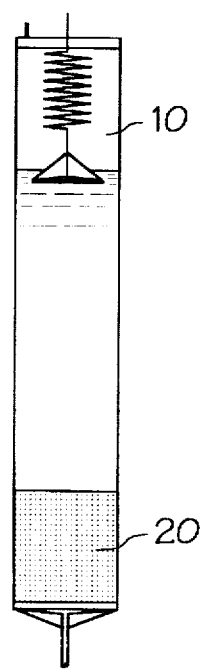
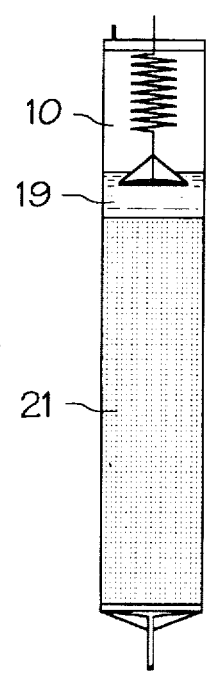
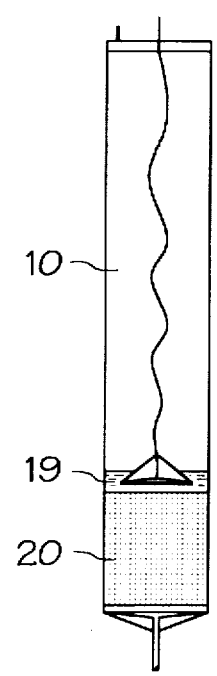
FIG. 3a    FIG. 3b    FIG. 3c
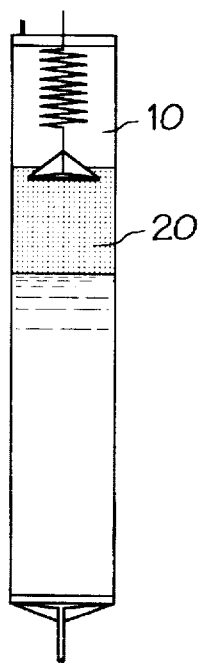
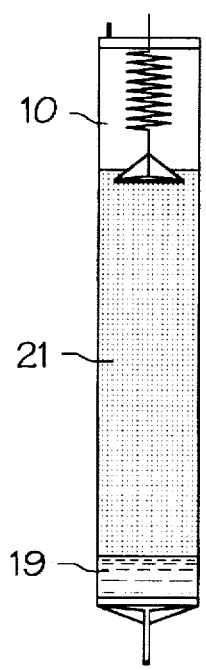
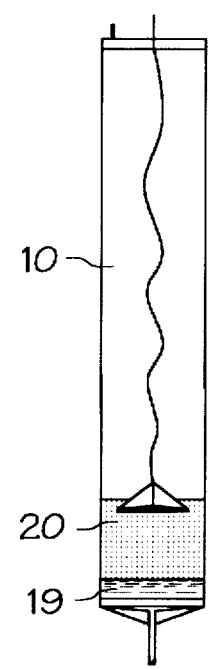
FIG. 4a    FIG. 4b    FIG. 4c

COLUMN ARRANGEMENT

TECHNICAL FIELD

The present invention relates to a column construction which includes a movable adaptor that can be used to deliver liquid to or to lead liquid away from a liquid permeable bed in which it is desired to adsorb a substance present in the incoming liquid. The adaptor may also be used in the desorption/elution/washing of the bed. The adaptor is adapted particularly for fluidized beds (=expanded particle beds).

By "movable" is meant that the adaptor can be moved in the direction of flow applied during an adsorption/desorption/washing process.

A fluidized (expanded) bed consists of particles and a through-flowing liquid that keep the particles suspended within a given volume. Such beds have long been used in fermentation processes, among others. In recent times the fluidized bed has also been used as a separation medium in liquid chromatography (WO-A-9218237 and WO-A-9200799).

Particles which have a density which is higher than the density of a surrounding liquid can be fluidized by allowing liquid to flow through the bed in a direction which opposes the direction of gravity (an upwardly directed flow). When the particles have a density which is lower than the density of the surrounding liquid, a downwardly directed flow is required to fluidize the bed. See WO-A-9218237 and WO-A-9200799.

A fluidized bed is considered to be stable when each individual particle keeps within a given cross-section of the column (perpendicular to the flow direction). The settling tendencies of the particles (settling rate measured without counterflow) depends on density and size. In the case of a stabilized fluidized bed, this tendency increases continuously along the flow direction. Those particles which have the most pronounced settling tendency position themselves furthest down in the column. See, for instance, WO-A-9218237. Stable fluidized beds shall be vertical (±0.5°) with vertical flow direction (±0.5°).

A DESCRIPTION OF THE BACKGROUND ART AND A RÉSUMÉ OF THE PROBLEMS SOLVED BY THE INVENTION

Adapters earlier used in liquid chromatography are intended to hold a stationary phase (bed) in place and to lead the flow either from or to the stationary phase. Consequently, adapters have had a distributing function on that side which is proximal to the stationary phase, and an opening on the opposite or distal side through which liquid is either delivered or led away.

Movable adapters have earlier been used in chromatography in conjunction with matrices which are packed conventionally in columns. This movability has been achieved by applying a controllable force on the matrix via the adaptor, either through

- a rod which extends up through an upper end-piece on the column; or
- a hydraulic/pneumatic pressure applied in the space between the adaptor and an upper end-piece.

This latter alternative also requires the use of a rod which extends up from the adaptor through the column end-piece, although in this case in order to hold the adaptor in position relative to the upper surface of the gel bed.

Movable adapters intended for fluidized beds and conventional column constructions have long been marketed by Pharmacia Biotech AB, Uppsala, Sweden. These adapters employ hydraulic pressure in accordance with the above.

The main drawbacks of the known techniques are:

Strict requirements are placed on the sealing surface between column wall and adaptor, which results in higher manufacturing costs and a leakage sensitive system. The risk of leakage is affected by the tolerances on the column wall and the adaptor seal, sealing pressure and the resistance of the seal to temperature and chemicals. This has led to demands for extremely small tolerances with regard to the column wall and to the adaptor.

The sealing surface between column wall and adaptor makes it difficult to clean the systems. Pockets readily form.

The adaptor jams easily (easily becomes askew) when scaling-up the column (primarily in regard of column diameters larger than 1 m).

The height of the construction is twice that of the height of the column (due to the rod mounted on earlier described movable adapters).

It is difficult to remove air that is able to collect beneath the adaptor (due to the requirement of stationary seals on the earlier described movable adapters).

It is difficult to loosen agglomerated material, cells, bacteria and gel that may have agglomerated on the bottom surface of the net. These layers grow at times and form "cakes" which impede the throughflow of liquid.

It is necessary to lengthen the net that normally covers that side of the adaptor which faces towards the matrix in the case of larger diameters (>1.5 m), because those nets that are commercially available are too small.

The invention provides improvements with regard to the aforesaid drawbacks of known techniques.

DE 1,642,812 describes in FIG. 4 an embodiment of a movable adaptor that is intended for ion-exchange chromatography on a compact bed. The adaptor is positioned on top of the bed and is following movements of the bed.

BRIEF DESCRIPTION OF THE DRAWINGS

An inventive column construction and adaptor are illustrated in the accompanying drawings, in which:

FIG. 3 illustrates schematically an inventive construction applied for chromatography on a fluidized bed in which suspended particles have a density which is higher than the density of the through-flowing liquid. The bed is shown in a non-expanded state prior to chromatography (FIG. 3a), in an expanded state (FIG. 3b) and in a collapsed non-expanded state after chromatography, in which latter state the bed is ready for washing and/or desorption (FIG. 3c).

FIG. 4 illustrates schematically an inventive construction applied for chromatography on a fluidized bed in which suspended particles have a density which is lower than the density of the through-flowing liquid. The bed is shown in a non-expanded state prior to chromatography (FIG. 4a), in an expanded state (FIG. 4b) and in a collapsed non-expanded state after chromatography, and ready for washing and/or desorption (FIG. 4c).

Details which have mutually the same function have been identified with the same reference numerals, unless otherwise stated. The directions of the liquid flows are shown with the aid of arrows.

DESCRIPTION OF THE INVENTION

Figure 1A:
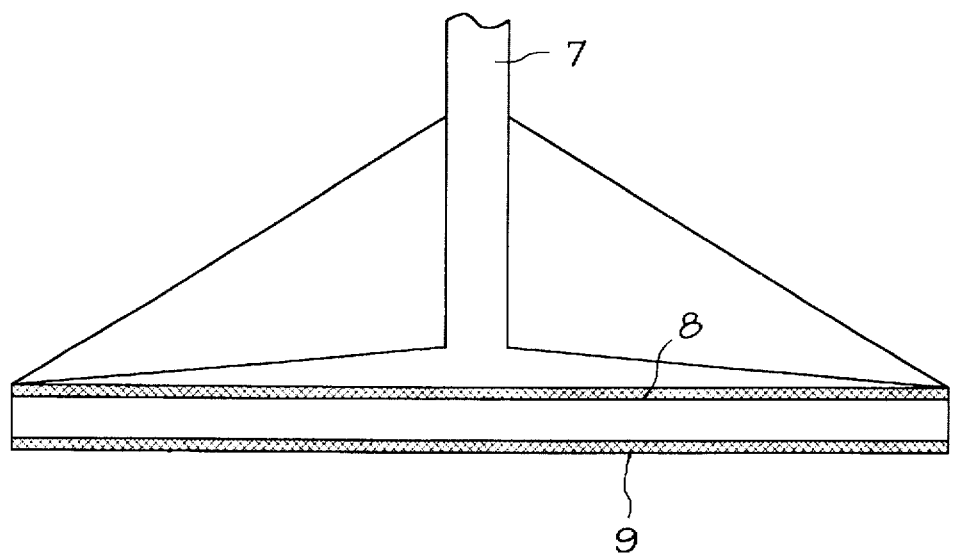
FIG. 1a is a side view of one embodiment of an upper adaptor.

The invention relates to a construction which includes
a. a vessel (1) which contains a liquid-permeable bed (2);
b. a bottom adaptor (3) which (I) is placed in the lower part of the vessel and preferably defines the bottom of the vessel, either totally or partially, and (II) has an opening (4) through which liquid can be delivered/led away to/from the lower part of the vessel (preferably the bottom), said opening (4) being also directed preferably towards the bed (2) and provided with a distributing facility (5) for distribution/collection of liquid flow towards/from the lower part of the bed;
c. an upper adaptor (6) which (I) is placed in the upper part of the vessel and preferably covers the cross-sectional area of said vessel completely or partially and (II) has an opening (7) through which liquid is able run from/to the upper part of the vessel, said opening (7) also preferably being directed towards the bed (2) and provided with a distribution facility (8) for distribution/collection of liquid flow towards/from the upper part of the bed; and
d. means (23, 24) for leading liquid flow to the adapters (3, 6) through the opening (4) in the lower or bottom adaptor (3) and/or through the opening (7) in the upper adaptor (6).

According to the inventive concept, the upper adaptor behaves as a buoyant body when in use. This buoyancy function can be achieved when the density of the adaptor is lower than the density of the through-flowing liquid, i.e. a density lower than 1 g/cm$^3$ in the case of water and water-miscible organic solvents. The adaptor is thus comprised completely or partially of material which has a density below 1 g/cm$^3$. If the adaptor includes material of higher density, this is compensated for with cells of lower compactness, e.g. air cells. Because the adaptor behaves as a buoyant body, it is able to move in the direction of flow (both with and against the flow).

According to the present invention, there can be permitted between the periphery of the upper adaptor (the buoyant adaptor) and the vessel wall or walls a gap which in normal cases may be 0.01–10 mm in size. This gap provides the advantage of avoiding "jamming", enables air beneath the adaptor to be easily removed, enables the adaptor to be set into motion in order to release agglomerates that have caked beneath the net, enables desired sensors (e.g. particle sensors) to be inserted into the liquid zone, and so on. An excessively large gap should be avoided, since such a gap may easily result in pockets of liquid in which material is able to collect in an undesirable manner. The size of an appropriate gap will depend on the inner diameter of the column casing, among other things.

Figure 1B:
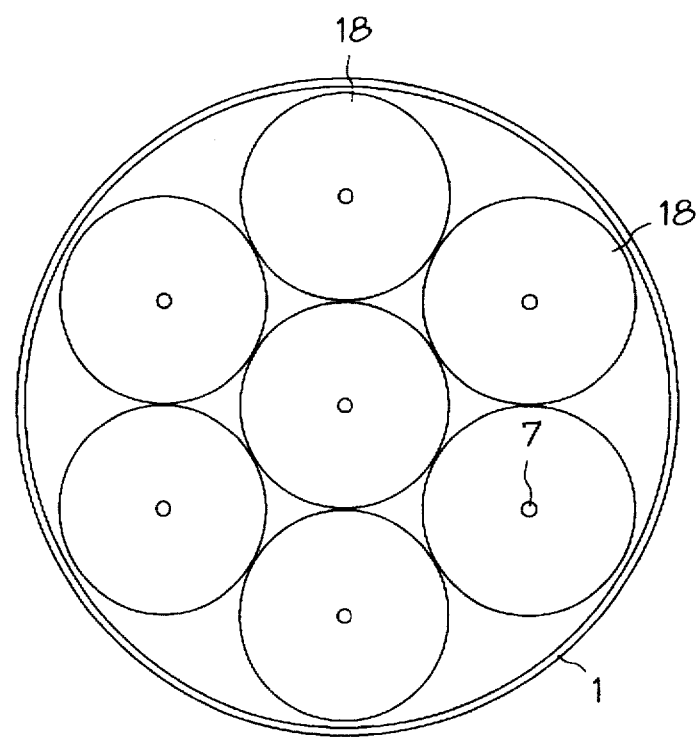
FIG. 1b is a view from above of one embodiment of an upper adaptor comprised of sections. Each small circle represents one section having a flow opening (the centre hole).

The buoyant adaptor (see FIG. 1a) used in accordance with the invention has at least one liquid opening (7) on its upper side. The underside of the adaptor is usually circular in shape (faces towards the bed/matrix) and includes a distributing facility (8), which may have the form of one single hole or of a number of holes which are distributed uniformly across the underside of the adaptor and are in liquid communication with the opening (7). The distributing facility, or means, may be covered with a woven fine-mesh material (net) (9), in order to prevent particles from the matrix/the bed clogging the distributing facility. As illustrated in FIG. 1b, the adaptor may be comprised of sections (18), each having a liquid inlet/liquid outlet opening (7). The sections need not abut one another.

Studies made hitherto have indicated that known techniques can be utilized in the construction of the adaptor, provided that the requirements of buoyancy and movability in relation to through-flowing liquid are fulfilled.

The vessel (1) containing the liquid-permeable bed may have any one of a number of different geometrical shapes, although the most common and most practical configuration is a generally straight tube (column), i.e. does not taper, which is positioned vertically. The vessel may be made of glass, plastic, metal or some other inert material.

The liquid-permeable bed is formed by packed beadsor of particles or monoliths (continuous matrices). Porous particles and continuous matrices are often used. Particle beds may be fluidized (=expanded).

The liquid may either flow vertically downwards or vertically upwards with the tolerances for fluidized beds given above. The precise flow direction is determined by the design of the distribution facility in each adaptor. The distributing direction is as a rule the same as for the openings (7) and (4), respectively.

The devices (23 and 24) used to lead the liquid flow to/from the upper and the lower adaptor are comprised of connections for hoses or pipes, suitably made of plastic, glass, metal, etc. The devices (23 and 24) are only indicated symbolically in the figures. The flow of liquid is generated with the aid of an appropriate pump arrangement connected to one or to both of the adapters by means of said devices (23 and 24).

In order to make possible wider variations in bed height, particle density, density of through-flowing liquid and flow rate, the upper adaptor (6) may be provided with means which will enable a counterpressure, preferably a controllable counterpressure, to be applied to the adaptor and therewith counteract the pressure generated by the through-flowing liquid. This control is preferably effected pneumatically, by constructing the space (10) above the upper adaptor (6) as a gas chamber (most practically an air chamber) having direct connection to the upper side of the upper adaptor. Such a gas chamber can be created by mounting above the upper adaptor (6) in spaced relationship therewith an end-piece (11) which sealingly closes the upper end of the vessel. In the case of this embodiment, the opening (7) in the upper adaptor (6) is connected to an outer storage vessel or reservoir (not shown), preferably through the medium of the end-piece (11), by means of a liquid delivery line (12), preferably in the form of a flexible hose or a flexible pipe of the periscope kind. In the illustrated case, the gas chamber (10) includes an inlet (13) which coacts with a valve (14), preferably an adjustable valve for the outlet/inlet of gas (air). The inlet (13) will normally be arranged on the end-piece (11). The chamber (10) may be connected controllably to a pressure source, preferably via the inlet (13).

In one practical embodiment, the column is provided with a graduated vertical level pipe (15) which extends parallel with the vessel (the column) and the function of which may be combined with the function of a gel-bed sensor or some other sensor (16) relevant to the purpose and fixedly mounted on the adaptor. The sensor may, in turn, be connected to a signal processing unit (17). This arrangement enables the process taking place in the vessel to be controlled very effectively. The adaptor can be caused to move with the intention of releasing or dislodging any material that has agglomerated on the adaptor, by pulsating the liquid flow through the column or by pulsating the air pressure in the chamber (10).

FIGS. 3 and 4 illustrate an inventive construction applied to a fluidized bed, particularly a stable fluidized bed, in which the particles have either a higher or a lower density than the density of the through-flowing liquid. The vessel (1) has the form of an upstanding column. According to preferred embodiments, the construction includes an air chamber (10) which applies pressure on the upper side of the upper adaptor (6) (the buoyant adaptor) against the through-flowing liquid. As a result of the flow of liquid through the column, the fluidized bed (primarily a stable bed) can be generated in a zone of the liquid located between the upper and the lower adaptor.

When the particles in the fluidized bed have a density which is higher than the density of the liquid (FIG. 3), the inlet is effected via the lower adaptor (3) and the outlet is effected via the upper adaptor (6), the buoyant adaptor. The reference numeral (20) identifies the bed in a non-expanded state, while reference numeral (21) identifies the bed in an expanded state. When the bed is expanded and adsorption takes place, there will preferably be found a particle-free liquid layer (19) between the upper surface of the expanded bed and the upper adaptor (6, the buoyant adaptor).

When the density of the fluidized bed particles is lower than the density of the liquid (FIG. 4), the inlet is effected via the buoyant adaptor (6) and the outlet is effected via the lower adaptor (3). The reference numeral (20) identifies the bed in a non-expanded state, whereas the reference numeral (21) shows the bed in an expanded state. When the bed is expanded and adsorption takes place, there will preferably be found a particle-free liquid layer (19) between the lower surface of the expanded bed and the bottom adaptor (3).

The described structures may be mounted on a stand provided with feet which can be adjusted to facilitate vertical positioning of the structure. The stand may have the form of at least three stable pull rods which are placed uniformly around and parallel with the walls of the vessel (the column). The bottom parts of the rods are bent radially outwards from the vessel (the column), in order to improve stability.

When using the constructions illustrated in FIGS. 3–4, the process is commenced with a non-expanded bed. The vessel (1) (the column) is filled with liquid to a predetermined level in a first process stage. The vessel is filled with liquid which flows in through either the bottom or the upper adaptor. The direction of the incoming liquid flow is determined by whether the particles have a higher or lower density than the density of the incoming liquid (see above). The liquid outlet should be closed when filling the vessel, and the valve to the gas chamber open. When the desired liquid level has been reached, the flow is allowed to continue with the outlet open and the gas chamber closed, optionally after adjusting the rate of flow, until expansion of the fluidized bed is complete, for instance when a stable fluidized bed has been reached. It is normally endeavored to create a matrix-free liquid layer (19) at a distance of 5–30 mm between the expanded bed and the outlet adaptor (the upper adaptor in FIG. 3 and the lower adaptor in FIG. 4). This layer impedes clogging of the outlet adaptor. There is no requirement to create a corresponding layer between the inlet adaptor and the fluidized bed. The liquid level in the vessel (column) can be lowered, by reducing the liquid flow rate and/or increasing the gas chamber pressure. When the flow rate is increased and/or the gas chamber pressure decreased, a corresponding change in liquid level is obtained. When expansion of the bed is complete, a test run is carried out, optionally subsequent to an intermediate buffer exchange.

Subsequent to adsorption to the matrix, undesired material can be washed away by passing an appropriate buffer through the bed with the bed fully expanded, partially expanded or in a non-expanded state. The extent to which the bed is expanded can be changed by adjusting the pressure and/or changing the flow rate.

Desorption is effected with a desorption buffer, suitably with the bed in a non-expanded state and with the buffer flowing in a direction opposite to the direction in which adsorption took place. Prior to desorption, the bed is allowed to return to its non-expanded state, whereafter the flow is reversed and adjusted so that a thin particle-free liquid layer will form between the outlet adaptor (which is normally used as the inlet adaptor for the desorption process) and the non-expanded bed.

Washing and desorption may be effected in accordance with FIGS. 3c and 4c.

Figure 2:
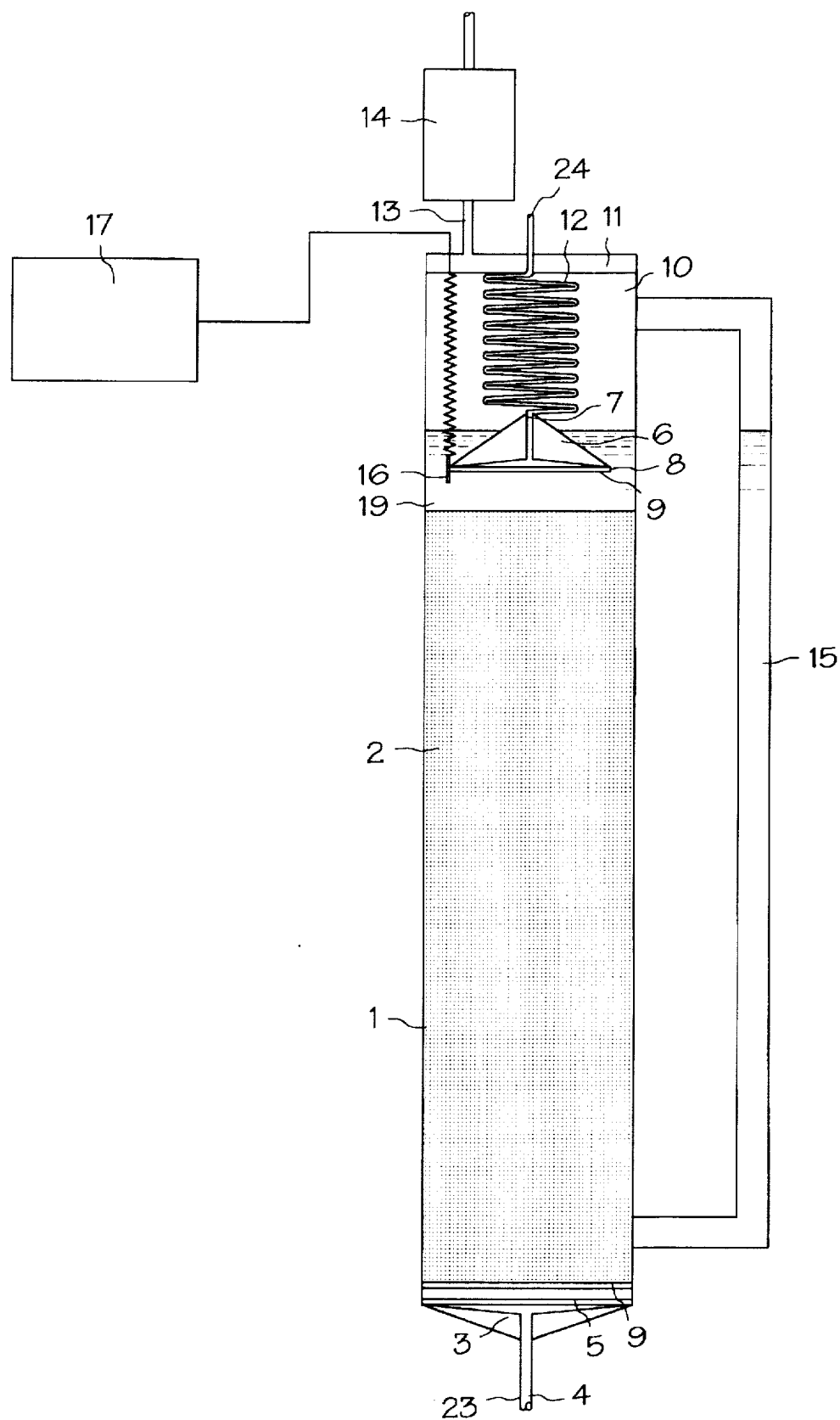
FIG. 2 illustrates the inventive construction that was most preferred on the date from which convention priority is claimed applied for chromatography on a fluidized bed.

The embodiments illustrated in FIGS. 2, 3 and 4 are the embodiments most preferred on the date from which priority is claimed, with the embodiment according to FIG. 3 being the main preference.

I claim:

1. A structure for the absorption or desorption of a substance on a bed through which liquid is allowed to pass, the structure comprising
   (a) a vessel containing a liquid-permeable bed;
   (b) a lower adaptor arranged in a lower part of the vessel and at least partially defining the vessel bottom, the lower adaptor having an opening for the passage of liquid to or from the lower part of the vessel, the opening being directed towards the bed, the lower adaptor being provided with a distribution facility for distributing or collecting liquid flow towards or from, respectively, a bottom surface of the bed;
   (c) an upper adaptor arranged in an upper part of the vessel and at least partially covering a cross-sectional area of the vessel, the upper adaptor having an opening for the passage of liquid to or from the upper part of the vessel, the opening being directed towards the bed, the upper adaptor being provided with a distribution facility for distributing or collecting liquid flow towards or from, respectively, an upper surface of the bed; and
   (d) means for providing a liquid flow to the bed through one of the adaptors and means for conducting a liquid flow away from the bed through the other adaptor,
   wherein the upper adaptor is movable vertically in the vessel and has a density, the density defining means for allowing the upper adaptor to float on liquid passing through or contained in the vessel.

2. A structure according to claim 1, wherein the vessel comprises a column casing and the bed is a fluidized bed.

3. The structure of claim 1, wherein the means for providing a liquid flow to the bed is connected with the lower adaptor and the means for conducting a liquid flow away from the bed is connected with the upper adaptor, and further wherein the bed is fluidized with beads having a density higher than that of a liquid flowing through the bed.

4. The structure of claim 1, wherein the means for providing a liquid flow to the bed is connected with the upper adaptor and the means for conducting a liquid flow away from the bed is connected with the lower adaptor, and further wherein the bed is fluidized with beads having a density lower than that of a liquid flowing through the bed.

5. A structure according to claim 1, wherein the upper adaptor has a density lower than 1 g/cm$^3$.

6. A structure according to claim 1, wherein the vessel includes means which function to generate a pressure against a liquid in the vessel.

7. A structure according to claim 1, further comprising an end-piece mounted above the upper adaptor, the end-piece sealingly covering the cross-sectional area of the vessel to form a chamber between the end-piece and the upper adaptor.

8. A structure according to claim 7, wherein the means for conducting a liquid flow away from the bed is connected with the opening, in the upper adaptor through the end-piece.

9. A structure according to claim 7, wherein the means for providing a liquid flow to the bed is connected through the end-piece to the opening in the upper adaptor.

10. A structure according to claim 7, wherein the chamber is provided with an air inlet.

11. A structure according to claim 10, wherein the air inlet is provided in the end-piece.

* * * * *